455-619 AU 233 EX
FIP8106 OR 3,379,888
EXAMINER
561,237

April 23, 1968 A. L. ROSSOFF 3,379,888

PHOTODIODE MIXING IN MULTIPLICATION REGION

Filed June 28, 1966

INVENTOR
ARTHUR L. ROSSOFF
BY James and Franklin
ATTORNEY

United States Patent Office 3,379,888

Patented Apr. 23, 1968

3,379,888

PHOTODIODE MIXING IN MULTIPLICATION REGION

Arthur L. Rossoff, Huntington Station, N.Y., assignor to General Instrument Corporation, Newark, N.J., a corporation of New Jersey Filed June 28, 1966, Ser. No. 561,237
10 Claims. (Cl. 250—199)

ABSTRACT OF THE DISCLOSURE

A photodiode mixer in which the diode has a voltage-current characteristic with a multiplication region, the diode being biased to operate in the multiplication region, the diode while thus biased being subjected to an electrical input and a light input, each at a different frequency, thereby to cause frequency mixing to occur in a resistance fashion.

Figure 1:
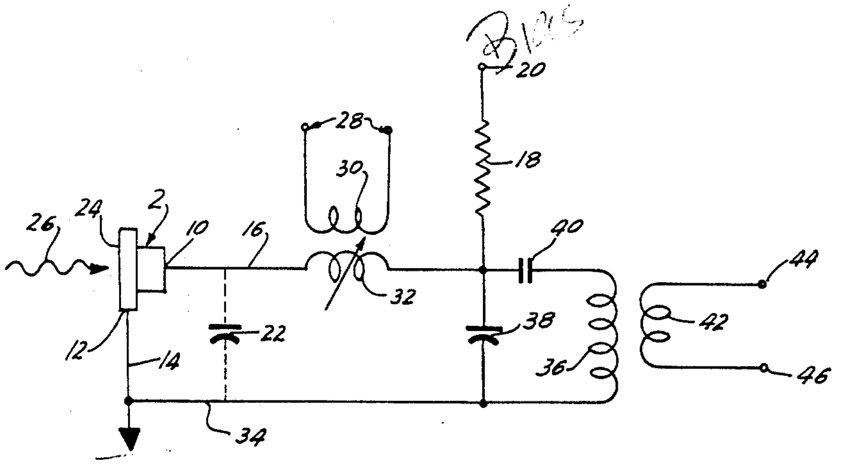

The present invention relates to a circuit arrangement including a photodiode, and to means for improving the effective signal-to-noise ratio thereof.

The advent of the laser and the appreciation of its potentialities as a medium for very wide band communication has led to a demand for optical detectors of commensurate capability. When a laser beam is used for communications purposes it is modulated, usually at a frequency in the microwave region. One instrumentality for detecting such modulated light beams is the semiconductor diode. In the present stage of technology the semiconductor diode is the only detecting device capable of realizing high quantum efficiency and at the same time handling modulation signals over a wide band width.

Semiconductor diodes, when they are employed as detectors in this fashion, are operated in the reverse bias region. The amount of current which they will pass will vary with the amplitude of the light which impinges upon the photodiode. In conventional circuits the output current from the photodiode detector is amplified and then converted, in a separate mixing circuit, to an intermediate frequency by mixing it with the output from a local oscillator operating at a frequency appropriately related to the modulation frequency of the laser beam.

A major problem involved in detecting circuits generally, and one which is also present in the photodiode detecting circuit, is the effect of noise. Noise tends to mask weak signals and to impair the intelligibility of signals of moderate strength. The measure of merit in any circuit arrangement, insofar as noise is concerned, is the signal-to-noise ratio; the greater that ratio, the better is the circuit.

There are two related characteritsics of the semiconductor diode when used as a detector which predominantly enter into the problem of maximizing the signal-to-noise ratio. One is the fact that the output signal is in the form of a current, and the other is the fact that the diode has an inherent capacitance between its two terminals.

Because the output signal from the diode is in the form of a current, which is desirably converted to a voltage for subsequent use, the magnitude of the output voltage signal becomes proportional to the magnitude of the load impedance to which the diode is connected. The same is true of that component of the inherent diode noise which is associated with quantized fluctuations of photocurrent (often termed "shot noise"). The noise signals resulting from the thermal agitation of the diode's inherent series resistance and the noise arising from sources in subsequent amplification stages will not be proportional to load impedance. Hence the effect of those noises other than shot noise can be minimized by using the highest possible load impedance. This will increase the signal voltage (and, unavoidably, the shot noise voltage) without increasing the other noise voltages, thus giving rise to that optimum condition termed "shot noise limited."

It is precisely here that the inherent capacitance of the diode has its effect. That inherent capacitance, together with the diode's inherent series resistance, comprises a by-pass or filter circuit for very high frequencies, and the higher the output impedance, the greater is the proportion of the signal which is shunted or filtered, thereby reducing the total output power fed to the load connected to the diode. At high frequencies on the order of one gHz., which frequencies are often employed for modulation in connection with laser communication, the output power loss when high impedance loads are connected to the diode becomes excessive, and as a result rather small load impedances must be used in order to realize effective amounts of power in the output circuit. Minimizing the load impedance has the unavoidable effect, as has been explained, of increasing the relative effectiveness of noise other than shot noise, and preventing the attainment of, or even a reasonably close approach to, a shot-noise-limited condition.

The prime object of the present invention is to devise a circuit arrangement by means of which a much closer approach to a shot-noise-limited condition can be realized in connection with the use of semiconductor diodes as detectors of light signals fluctuating at very high modulation frequencies.

The inherent capacitance of the diode cannot be eliminated. However, its deleterious effect lessens as the frequency of the output signal is decreased. While the inherent capacitance is a problem at the usual modulation frequencies employed in laser communication, such as one gHz. or higher, it is very much less of a problem at the intermediate frequencies used in detection circuits, such as sixty mHz.

Accordingly, in accordance with the present invention the high frequency modulated light input signal is resistively mixed, in the semiconductor diode itself, with a local oscillator signal, so that the current output from the semiconductor diode fluctuates at a comparatively low intermediate frequency. Because the intermediate frequency is comparatively low, a high load impedance may be employed—the inherent capacitance of the diode will not, at the comparatively low intermediate frequency, bypass any substantial portion of the output power—and hence a much closer approach to the ideal of a shot-noise-limited condition may be realized.

The mixing in the diode is accomplished when the diode, if reverse-biased sufficiently, has a voltage-current characteristic such that variations in voltage would result in appreciable variations in current. Areas of voltage-current characteristics of this nature are generally termed a "multiplication region." In the normal operating range of photodiodes the output current, for a given amount of illumination, is relatively insensitive to voltage changes. However, in the multiplication region as the reverse bias increases the current flow will also increase. By utilizing this phenomenon, and causing the reverse bias applied to the diode to fluctuate at a local oscillator frequency while the diode is operating in its multiplication region, resistive mixing takes place in the diode between the local oscillator signal and the modulation of the light signal, the output current then having a component fluctuating at the intermediate frequency. Since the intermediate frequency is much lower than either the local oscillator frequency or the modulation frequency of the received laser beam, a load impedance of appreciable magnitude can be employed with a proportionate gain in signal without a corresponding gain in noise other than shot noise. The precise values of the intermediate modulation and local oscillator frequencies are not critical, and the values here given are only exemplary.

Figure 2:
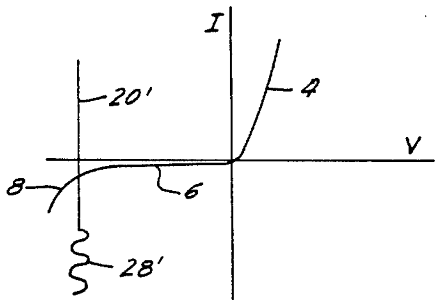

To the accomplishment of the above, and to such other objects as may hereinafter appear, the present invention relates to a mixing circuit including a photodiode, as defined in the appended claims and as described in this specification, taken together with the accompanying drawings, in which:

FIG. 1 is a circuit diagram of a typical embodiment of the present invention; and FIG. 2 is a graphical representation of a typical voltage-current characteristic of a photodiode suitable for use in the present invention.

FIG. 2 is a graphical representation, for a given level of illumination, of the voltage-current characteristic of a photodiode such as is generally identified in FIG. 1 by the reference numeral 2. There will be a family of such curves for a given diode, each curve representing the current output for a different level of illumination. When the diode 2 is forwardly biased, that is to say, when the voltage bias is in a positive sense, the current output, as indicated by the graph portion 4 in FIG. 2, will be high and will rise very rapidly with increases in voltage. However, when the diode 2 is reverse-biased, and as indicated by the graph portion 6 in FIG. 2, current will flow through the diode 2 only with difficulty, and the amount of current flowing therethrough for a given level of illumination will, within limits, be substantially constant with changes in voltage. However, as the reverse bias is increased, as indicated by the graph portion 8, the current which passes through the diode 2 will become much more responsive to changes in voltage, so that bias voltage variations over an appreciable range will produce corresponding appreciable output current variations. It is the operating region represented by the graph portion 8 in FIG. 2 which is termed the multiplication region" of operation of the diode. It is by operating the diode 4 in this region and utilizing it as an instrumentality for the mixing of two different signals, that the objectives of the present invention are attained.

Thus, as may be seen from reference to FIG. 1, the photodiode 2 is provided with terminals 10 and 12. Terminal 12 is connected by lead 14 to ground. Terminal 10 is connected by lead 16 and resistor 18 to a suitable source 20 of biasing voltage, the magnitude and polarity of the biasing volage 20 being such as to cause the diode to operate in its multiplication region, as indicated by the graph section 8 in FIG. 2. The inherent capacitance of the diode 2, effective across the terminals 10 and 12, is indicated in FIG. 1 by the capacitor 22.

The face 24 of the photodiode 2 is adapted to be exposed to a modulated light signal, the modulations of which are schematically represented by the line 26 in FIG. 1. These modulations may be at an appropriate high frequency, in the range of one gHz., and they will cause a corresponding high frequency variation in the current output from the diode 2.

In order to reduce the frequency of the output signal from the diode 2, and at the same time perform an operation necessary in any event, to wit, the mixing of the light signal modulation with a local oscillator signal so as to produce a signal fluctuating at an intermediate frequency, the mixing is performed in the diode 2 while the diode is operating in its multiplication region as aforesaid. Thus in FIG. 1, 28 represents a source of local oscillator signal which may be produced in any fashion. It is connected to coil 30, which is in turn inductively associated with adjustable inductance 32 connected in the line 16. Inductance 32 is preferably so designed that, in conjunction with the magnitude of the inherent diode capacitance 22, a resonant circuit is defined which oscillates at the frequency of the local oscillator signal. As a result the voltage output of the local oscillator source 28, represented by the line 28′ in FIG. 2, and oscillating at a frequency such as one gHz. plus or minus sixty mHz, for example, is superimposed upon the DC reverse bias applied to the diode 2, as represented by the line 20′ in FIG. 2.

The output current from the diode 2 is fed by lead 16 and by ground lead 34 to a resonant circuit comprising inductance 36 and capacitance 38 connected in parallel with one another. Capacitor 40 is included in the circuit 36, 38 and is located between the biasing source 20 and ground in order to block the bias voltage from ground. The magnitudes of the inductance 36 and capacitors 38 and 40 are so selected that the circuit defined thereby will resonate at the intermediate frequency constituted by the difference (here indicated, by way of example, as sixty mHz.) between the modulation frequency of the light signal 26 and the oscillatory frequency of the local oscillator signal 28′. The value of the capacitor 38 is such as to constitute substantially a by-pass for signals at the local oscillator frequency. The coil 36 is inductively associated with output coil 42 having terminals 44 and 46 which may be connected to any suitable external circuitry.

As a result of the connection and mode of operation of the circuit parts as indicated, the useful component of the output current from the diode 2 will oscillate at a comparatively low intermediate frequency to which the circuit 36, 38 is resonant, and hence a corresponding signal will be produced across the terminals 44 and 46. A load impedance of suitably high magnitude may be connected across the terminals 44 and 46, thereby to maximize the output voltage signal without similarly increasing the noise signal due to the thermal agitation of the diode's own series resistance and other noise signals not deriving from shot noise, thereby to improve the overall signal-to-noise ratio of the circuit. This may be done because the inherent diode capacitance 22 will not constitute an effective power by-pass at the low intermediate frequencies involved. An improvement in signal-to-noise ratio by several orders of magnitude is realized. In addition, mixing is achieved, thus eliminating the necessity for a subsequent mixing circuit. Thus, improved overall circuit operation is attained by means of simpler and less expensive circuitry.

The circuit diagram of FIG. 1 discloses the use of lumped parameter components. It will be understood that this is merely exemplary, and that at higher frequencies, such as those in the neighborhood of one gHz., it is more likely that the circuit would employ transmission line components than the lump parameter components specifically shown, all as is well known to those versed in the art.

While but a single embodiment of the present invention has been here specifically disclosed, many variations may be made therein, all within the scope of the invention as defined in the following claims.

I claim:

1. A mixing circuit comprising a photodiode having a voltage-current characteristic with a multiplication region, reverse biasing means operatively connected to said photodiode to cause it to operate in said multiplication region, said diode being adapted to be exposed to a light signal fluctuating at a first high frequency, a source of electrical signals oscillating at a second high frequency different from said first high frequency, means electrically connecting said source to said diode, and an output circuit operatively connected to said diode, whereby, as a result of resistive mixing, the output signal in said output circuit will oscillate at an intermediate frequency determined by said first and second high frequencies.

2. The circuit of claim 1, in which said output circuit comprises an oscillatory circuit resonant at said intermediate frequency.

3. The circuit of claim 2, in which said means electrically connecting said source to said diode comprises an oscillatory circuit resonant at said second high frequency.

4. The circuit of claim 2, in which said means electrically connecting said source to said diode comprises an oscillatory circuit resonant at said second high frequency, said oscillatory circuit comprising an inductance in series with said diode and cooperating with the inherent capacitance of said diode.

5. The circuit of claim 2, in which said means electrically connecting said source to said diode comprises an oscillatory circuit resonant at said second high frequency, said oscillatory circuit comprising an inductance in series with said diode and cooperating with the inherent capacitance of said diode, said inductance being inductively linked to said source.

6. The circuit of claim 1, in which said means electrically connecting said source to said diode comprises an oscillatory circuit resonant at said second high frequency.

7. The circuit of claim 6, in which said oscillatory circuit resonant at said second high frequency comprises an inductance in series with said diode and cooperating with the inherent capacitance of said diode.

8. The circuit of claim 6, in which said oscillatory circuit resonant at said second high frequency comprises an inductance in series with said diode and cooperating with the inherent capacitance of said diode, said inductance being inductively linked to said source.

9. A mixing circuit comprising a photodiode having a pair of terminals and characterized by a voltage-current characteristic with a multiplication region, an inherent capacitance existing between said terminals, said diode being adapted to be exposed to a light signal fluctuating at a first high frequency, a reverse biasing means operatively connected to said terminals so as to cause said photodiode to operate in said multiplication region, an output circuit resonant at an intermediate frequency and connected to said terminals, a source of signals oscillating at a second high frequency differing from said first high frequency, an inductance connected between one of said diode terminals and said output circuit, said inductance together with said inherent capacitance defining a circuit resonant at said second high frequency, and an operative connection between said source and said inductance.

10. The mixing circuit of claim 9, in which said operative connection between said source and said inductance is inductive in nature.

References Cited

UNITED STATES PATENTS

| | | | |
|---|---|---|---|
| 1,822,061 | 9/1931 | Roberts | 250—199 |
| 2,206,072 | 7/1940 | Barthelemy | 250—199 |
| 3,132,258 | 5/1964 | Gaertner et al. | 250—199 X |
| 3,237,011 | 2/1966 | Sterzer | 250—199 |

ROBERT L. GRIFFIN, *Primary Examiner.*

JOHN W. CALDWELL, *Examiner.*

A. MAYER, *Assistant Examiner.*